United States Patent
Ozluturk et al.

(10) Patent No.: US 8,270,512 B2
(45) Date of Patent: Sep. 18, 2012

(54) METHOD AND APPARATUS FOR SUBCARRIER AND ANTENNA SELECTION IN MIMO-OFDM SYSTEM

(75) Inventors: Fatih Ozluturk, Port Washington, NY (US); Philip J. Pietraski, Huntington Station, NY (US); Aykut Bultan, Bayside, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 986 days.

(21) Appl. No.: 11/082,286

(22) Filed: Mar. 17, 2005

(65) Prior Publication Data
US 2006/0034382 A1 Feb. 16, 2006

Related U.S. Application Data

(60) Provisional application No. 60/601,200, filed on Aug. 12, 2004.

(51) Int. Cl.
*H04B 7/02* (2006.01)
(52) U.S. Cl. ........ 375/267; 375/296; 375/260; 375/299; 375/347; 370/343; 370/329; 370/203
(58) Field of Classification Search .................. 375/260, 375/267; 455/102
See application file for complete search history.

(56) References Cited

U.S. PATENT DOCUMENTS

| | | | | |
|---|---|---|---|---|
| 5,909,436 | A * | 6/1999 | Engstrom et al. ............. | 370/343 |
| 6,473,467 | B1 * | 10/2002 | Wallace et al. ............... | 375/267 |
| 6,751,187 | B2 | 6/2004 | Walton et al. | |
| 6,859,503 | B2 * | 2/2005 | Pautler et al. ................. | 375/299 |
| 6,956,907 | B2 * | 10/2005 | Ketchum ....................... | 375/267 |
| 7,006,464 | B1 * | 2/2006 | Gopalakrishnan et al. ... | 370/328 |
| 7,072,413 | B2 | 7/2006 | Walton et al. | |
| 7,085,223 | B2 * | 8/2006 | Izumi ............................ | 370/204 |
| 7,120,395 | B2 * | 10/2006 | Tong et al. .................... | 455/101 |
| 7,154,960 | B2 * | 12/2006 | Liu et al. ....................... | 375/267 |
| 7,260,366 | B2 * | 8/2007 | Lee et al. ...................... | 455/102 |
| 7,304,939 | B2 * | 12/2007 | Steer et al. .................... | 370/208 |

(Continued)

FOREIGN PATENT DOCUMENTS

EP 1185048 3/2002

(Continued)

OTHER PUBLICATIONS

Jones, Raleigh. "Channel Estimation for Wireless OFDM Systems." IEEE Global Telecommunications Conference, Sep. 2-4, 1998, pp. 980-985

(Continued)

*Primary Examiner* — Lihong Yu
(74) *Attorney, Agent, or Firm* — Volpe and Koenig, P.C.

(57) ABSTRACT

A method and apparatus for radio resources control in a multiple input multiple output (MIMO) orthogonal frequency division multiplexing (OFDM) communication system are disclosed. Channel metric is calculated for each of a plurality of transmit antennas. Sub-carriers are allocated to each transmit antenna in accordance with the channel metric of each transmit antenna. Signals are transmitted using the allocated sub-carriers at each antenna. Adaptive modulation and coding and transmit power control of each sub-carrier may be further implemented in accordance with the channel metric. Power control may be implemented per antenna basis or per sub-carrier basis. In performing power control, a subset of transmit antennas may be selected and waterpouring may be applied only to the selected antennas. Waterpouring may be based on SNR instead of channel response.

10 Claims, 10 Drawing Sheets

U.S. PATENT DOCUMENTS

| | | | |
|---|---|---|---|
| 7,356,017 B2 * | 4/2008 | Codreanu et al. | 370/343 |
| 7,391,774 B2 * | 6/2008 | Lim et al. | 370/394 |
| 7,453,793 B1 * | 11/2008 | Jones et al. | 370/203 |
| 2003/0035491 A1 | 2/2003 | Walton et al. | |
| 2003/0043732 A1 | 3/2003 | Walton et al. | |
| 2003/0185310 A1 | 10/2003 | Ketchum et al. | |
| 2004/0023621 A1 | 2/2004 | Sugar et al. | |
| 2004/0105512 A1 | 6/2004 | Priotti et al. | |
| 2004/0114506 A1 | 6/2004 | Chang et al. | |
| 2004/0121730 A1 | 6/2004 | Kadous et al. | |
| 2004/0136349 A1 | 7/2004 | Walton et al. | |
| 2004/0233835 A1 * | 11/2004 | Benvenuto et al. | 370/203 |
| 2004/0258134 A1 | 12/2004 | Cho et al. | |
| 2005/0054313 A1 | 3/2005 | Gummadi et al. | |
| 2005/0111599 A1 | 5/2005 | Walton et al. | |
| 2005/0176436 A1 | 8/2005 | Mantravadi et al. | |
| 2005/0201295 A1 | 9/2005 | Kim et al. | |
| 2005/0213686 A1 * | 9/2005 | Love et al. | 375/299 |
| 2006/0034163 A1 | 2/2006 | Gore et al. | |
| 2008/0285488 A1 | 11/2008 | Walton et al. | |

FOREIGN PATENT DOCUMENTS

| | | |
|---|---|---|
| EP | 1533965 | 5/2005 |
| GB | 2411328 | 8/2005 |
| WO | 02/093779 | 11/2002 |

OTHER PUBLICATIONS

Jones, Raleigh. "Channel Estimation for Wireless OFDM Systems." IEEE Global Telecommunications Conference, Sep. 2-4, 1998, pp. 980-985.

* cited by examiner

TRANSMIT POWER IS RELATED TO THE AVERAGE CHANNEL GAIN

AMC IS RELATED TO THE AVERAGE CHANNEL GAIN OR OTHER METRIC

SUBCARRIER LEVEL GRANULARITY INSTEAD OF AVERAGE CHANNEL POWER!

SUBCARRIER LEVEL GRANULARITY INSTEAD OF AVERAGE CHANNEL POWER!

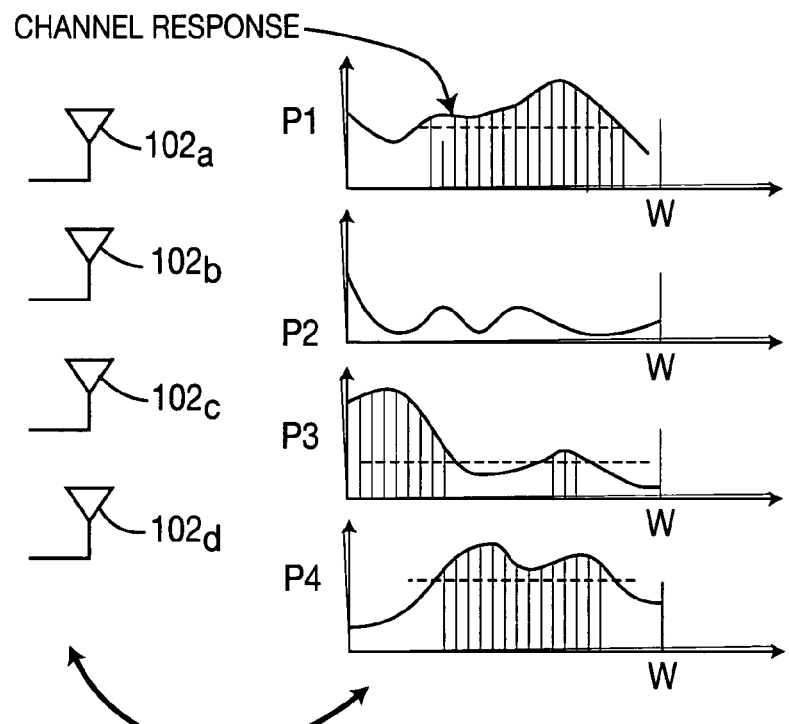
WATERPOURING IS APPLIED ONLY TO A SUBSET OF ANTENNAS FIG. 16
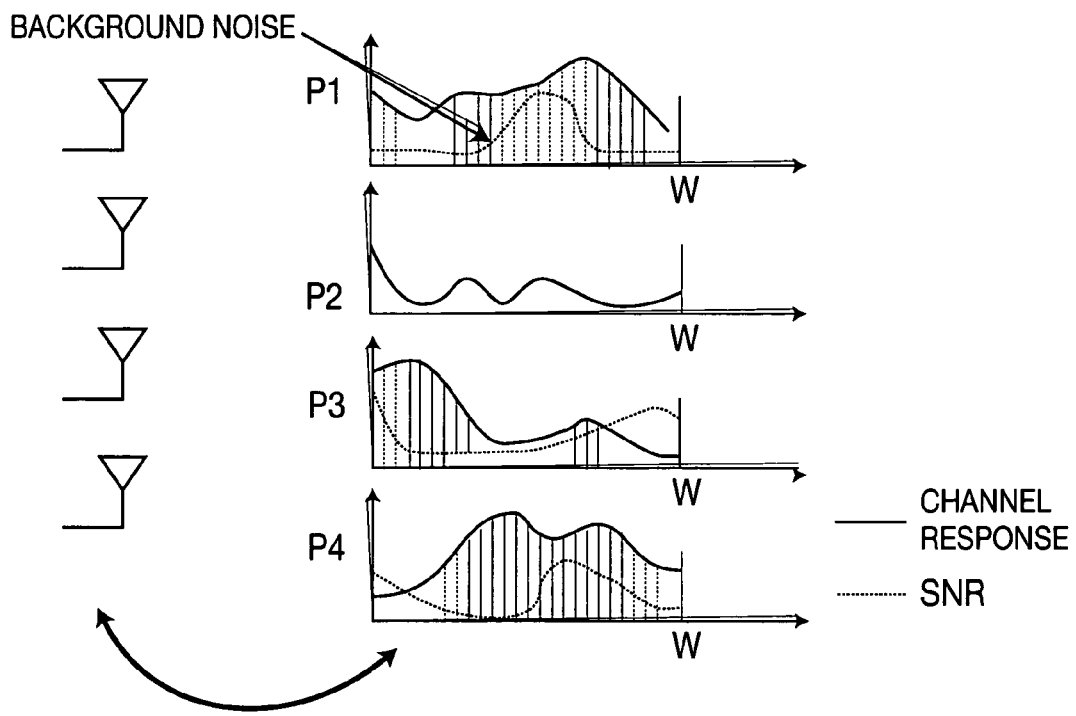
SNR BASED WATERFILLING RESULTS IN A DIFFERENT SOLUTION FIG. 17

METHOD AND APPARATUS FOR SUBCARRIER AND ANTENNA SELECTION IN MIMO-OFDM SYSTEM

CROSS REFERENCE TO RELATED APPLICATION

This application claims the benefit of U.S. Provisional Application No. 60/601,200 filed Aug. 12, 2004, which is incorporated by reference as if fully set forth.

FIELD OF INVENTION

The present invention is related to a wireless communication system. More particularly, the present invention transmits a data stream using multiple antennas in an orthogonal frequency division multiplexing (OFDM) communication system.

BACKGROUND

OFDM is a data transmission scheme where data is split into a plurality of smaller streams and each stream is transmitted using a sub-carrier with a smaller bandwidth than the total available transmission bandwidth. FIG. 1 shows a graphical representation of orthogonal sub-carriers in OFDM. The efficiency of OFDM depends on choosing these sub-carriers orthogonal to each other. In other words, the sub-carriers do not interfere with each other while each carrying a portion of the total user data.

OFDM system has advantages over other wireless communication systems. When the user data is split into streams carried by different sub-carriers, the effective data rate on each subcarrier is much smaller. Therefore, the symbol duration is much larger. A large symbol duration can tolerate larger delay spreads. In other words, it is not affected by multipath as severely. Therefore, OFDM symbols can tolerate delay spreads that are typical in other wireless communication systems, and do not require complicated receiver designs to recover from multipath delay.

As shown in FIG. 2, splitting the data stream into multiple parallel transmission streams still keeps the basic user data rate the same. Since each symbol duration increases proportionally, any delay spread is proportionally smaller. In practical implementations, the number of subcarriers is from 16 to 2,048.

Another advantage of OFDM is that the generation of orthogonal sub-carriers at the transmitter and receiver can be done by using inverse fast Fourier transform (IFFT) and fast Fourier transform (FFT) engines. Since the IFFT and FFT implementations are well known, OFDM can be implemented easily and does not require complicated receivers.

FIG. 3 is a block diagram of an exemplary OFDM transmitter and receiver. The heart of the transmitter and receiver are IFFT and FFT blocks. IFFT and FFT operations are mathematically almost the same. Therefore, a single computation engine is typically used for both IFFT and FFT operations.

For the benefits that OFDM provides, (i.e., simpler implementation, resistance to larger delay spreads, and efficient use of the spectrum), OFDM is one of the preferred wireless transmission schemes today. It is used in WLAN air interface such as 802.11a, WMAN such as 802.16, and it is part of many wireless communication standards.

Multiple-input multiple-output (MIMO) refers to the type of wireless transmission and reception scheme where both a transmitter and a receiver employ more than one antenna. FIG. 4 shows such a MIMO transmitter and receiver. A MIMO system takes advantage of the spatial diversity or spatial multiplexing and improves signal-to-noise ratio (SNR) and increases throughput.

There are primarily two types of MIMO systems. One type of MIMO system maximizes transmission data rate by taking advantage of the parallel transmissions with MIMO. An example of this type of MIMO scheme is the BLAST system. In this type of a system, the data stream is split into multiple parallel streams and sent across the air interface in parallel. Using a successive interference canceller (SIC) type detector, the receiver separates and collects all parallel streams. Therefore, the effective data rate over the air is increased.

Another type of MIMO system is Space-Time Coding (STC). An STC system provides a much more robust link and therefore can support higher signal constellations. In other words, STC increases the data rate over the air interface by increasing the signaling order, and therefore increasing the effective data rate over the air. An example of STC for a 2×2 MIMO is the so called Alamouti codes.

One of the techniques for increasing the efficiency of OFDM is "waterpouring" and refers to the way that the transmit power of each sub-carrier in OFDM is selected. FIG. 5 shows a typical waterpouring process. The transmitter obtains the channel estimation (step 1), inverts it (step 2), and allocates power to the corresponding sub-carriers starting from the lowest point until the total transmit power is reached (step 3). In order to implement waterpouring, the channel gain information across the transmission band should be known at the transmitter. The receiver may send channel estimation information back to the transmitter in a closed loop manner, or the transmitter can infer the channel from the signals received from the other side.

FIG. 6 shows a block diagram of a prior art MIMO system, such as VBLAST, where data is converted to parallel and transmitted over multiple antennas.

FIGS. 7 and 8 show a prior art scheme for controlling transmit power or modulation and coding scheme per antenna basis. In prior art, transmit power or modulation and coding scheme are determined in accordance with average channel gain or other metric. This scheme introduces flexibility by allowing the transmitter to allocate transmit power or modulation and coding scheme differently to different antennas based on channel response seen at the receiver for each transmit antenna.

FIG. 9 is a block diagram of a prior art system for operation in CDMA based systems known as PARC (per antenna rate control). This scheme transmits using the full transmit bandwidth from each antenna, as typical of any CDMA system. The prior art systems only address per antenna rate control, and not well suited for OFDM application since they are not making use of the sub-carrier level resource allocation available in OFDM.

FIG. 10 is a block diagram of another prior art system, called S-PARC (selective per antenna rate control). This scheme transmits using the full transmit bandwidth from each antenna, as typical of any CDMA system.

Prior art systems are not capable of taking advantage of the subcarrier level resource allocation that OFDM enables. The prior art system adjusts transmit power for each antenna transmission according to average gain across the band that the receiver sees from each transmit antenna. Therefore, the prior art systems are not suitable for OFDM where sub-carrier level resource control is available.

SUMMARY

The present invention is related to a method and apparatus for radio resources control in an MIMO-OFDM system.

Channel metric is calculated for each of a plurality of transmit antennas. Sub-carriers are allocated to each transmit antenna in accordance with the channel metric of each transmit antenna. Signals are transmitted using the allocated sub-carriers at each antenna. Adaptive modulation and coding and transmit power control of each sub-carrier may be further implemented in accordance with the channel metric. Power control may be implemented per antenna basis or per sub-carrier basis. In performing power control, a subset of transmit antennas may be selected and waterpouring may be applied only to the selected antennas. Waterpouring may be based on SNR instead of channel response. With the scheme of sub-carrier level resource control and power control, an additional dimension of flexibility is provided to optimize the system and increase practical throughput and link margin.

BRIEF DESCRIPTION OF THE DRAWINGS

FIG. 16 is a diagram showing application of waterpouring technique in accordance with the present invention.
FIG. 17 is a diagram showing application of SNR-based waterpouring technique in accordance with the present invention.

DETAILED DESCRIPTION OF THE PREFERRED EMBODIMENTS

Figure 1:
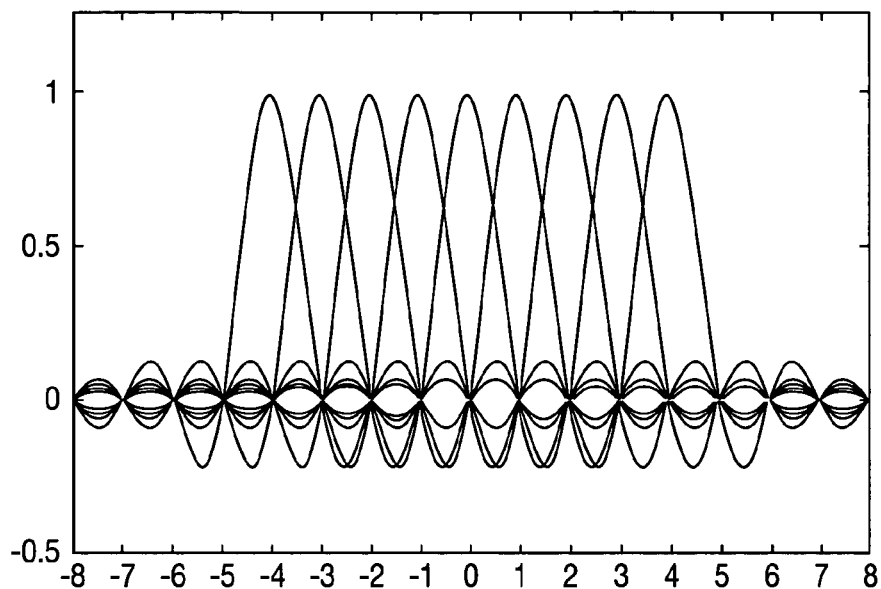
FIG. 1 shows a graphical representation of orthogonal sub-carriers in OFDM.
Figure 2:
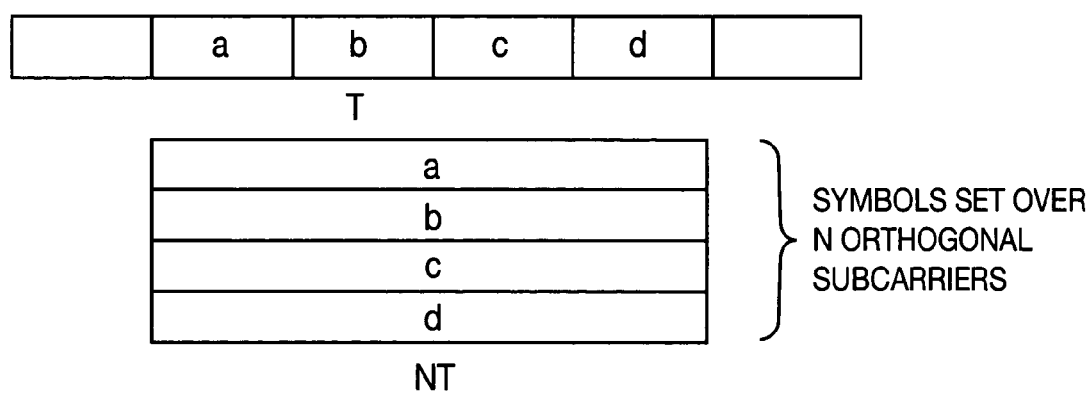
FIG. 2 is an illustration of splitting data streams into multiple parallel transmission streams.
Figure 3:
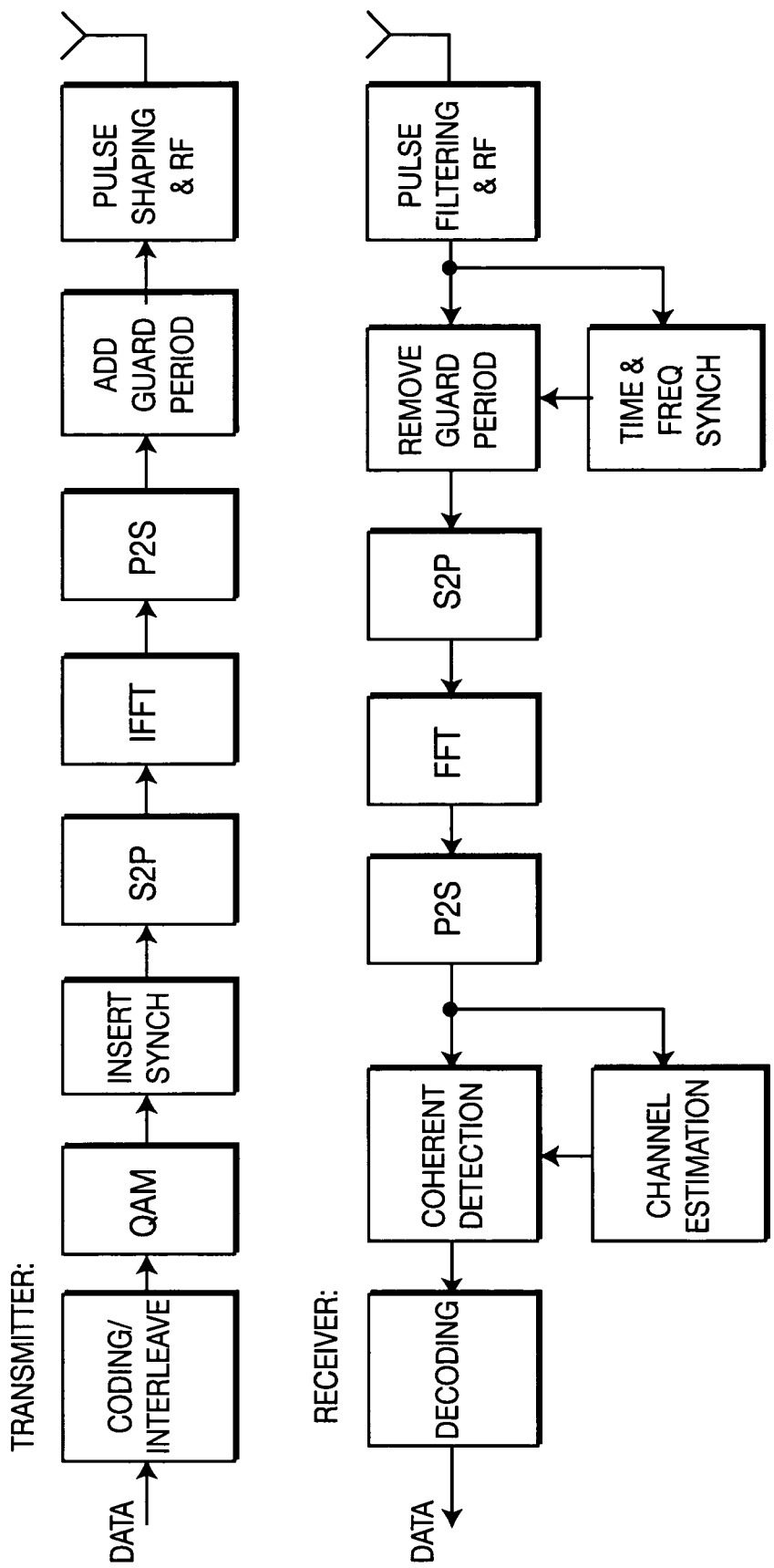
FIG. 3 is a block diagram of an OFDM transmitter and receiver.
Figure 4:
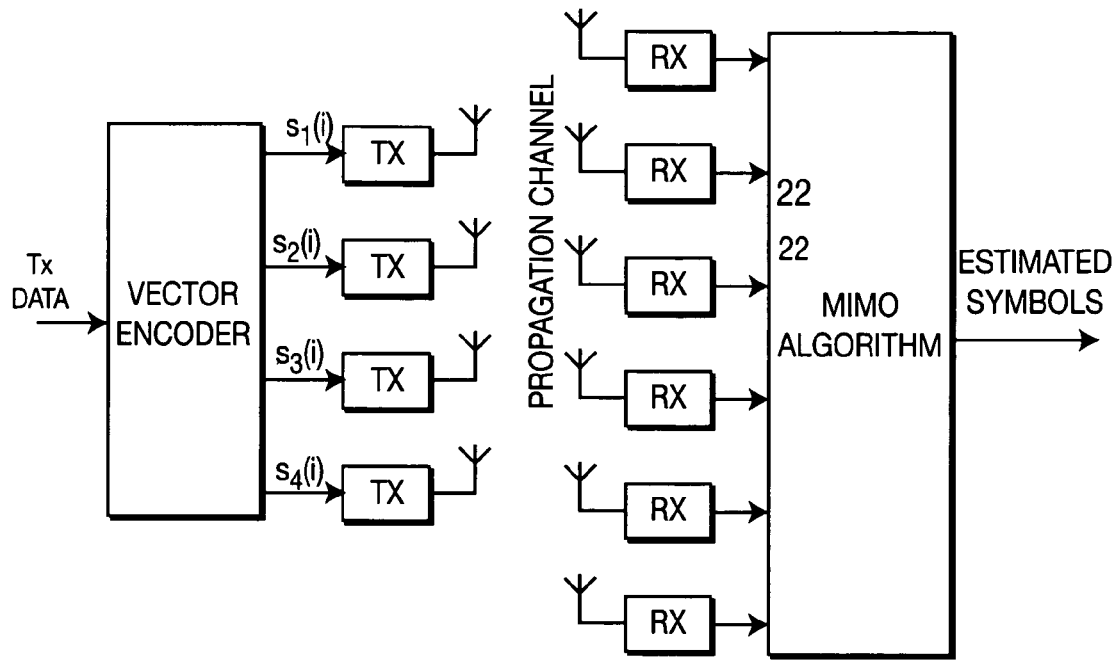
FIG. 4 is a block diagram of a prior art MIMO system.
Figure 5:
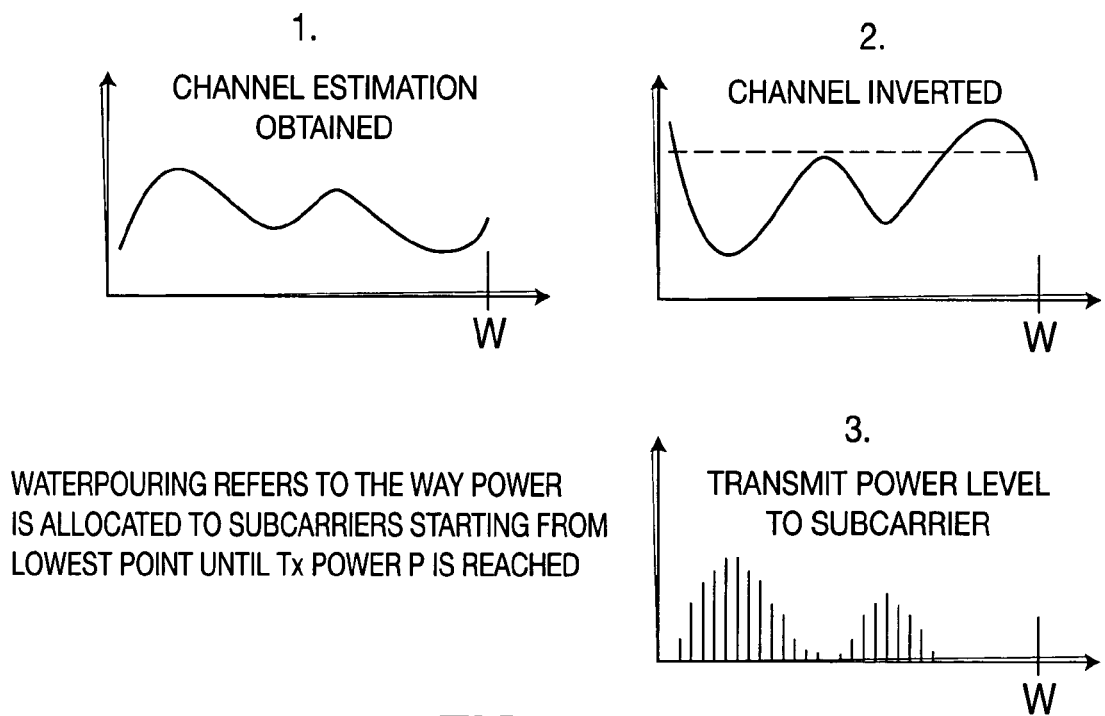
FIG. 5 shows a waterpouring procedure.
Figure 6:
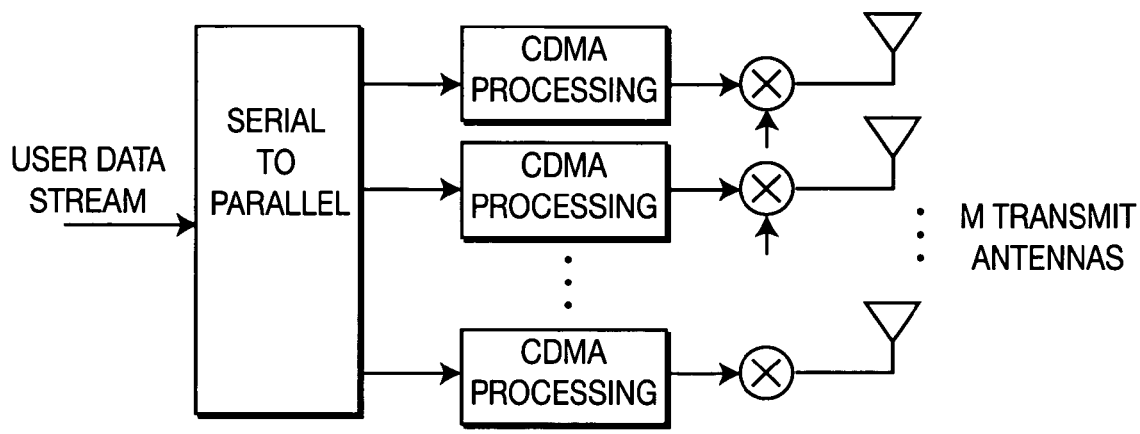
FIG. 6 is a block diagram of a prior art MIMO system.
Figure 7:
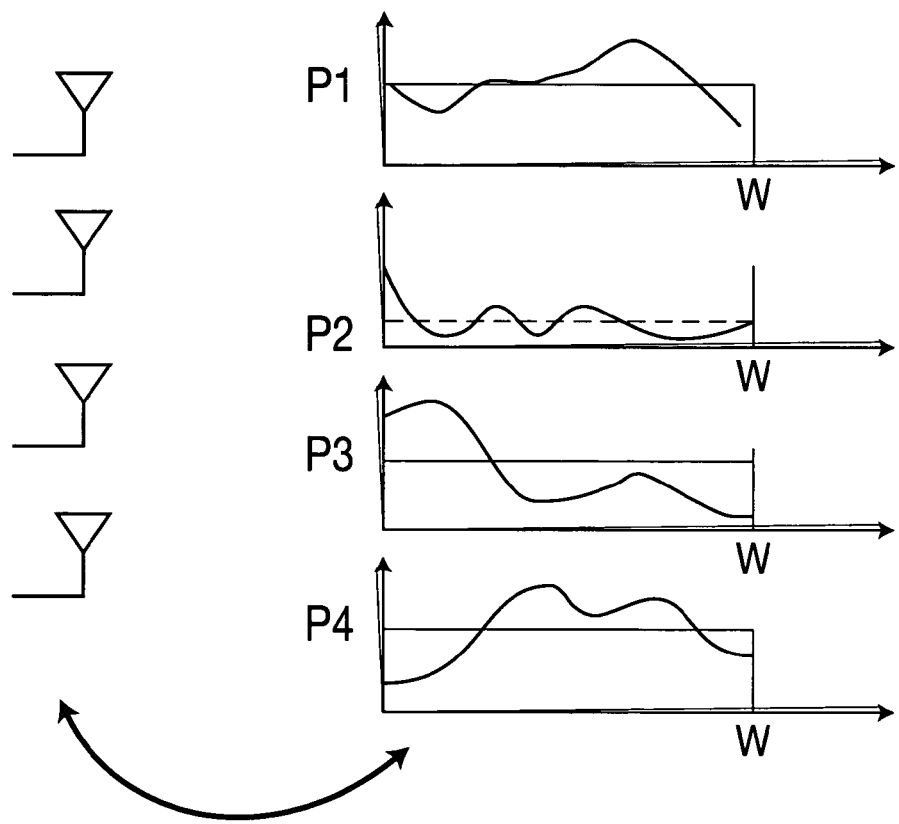
FIG. 7 is a diagram showing prior art method for controlling transmit power in MIMO system.
Figure 8:
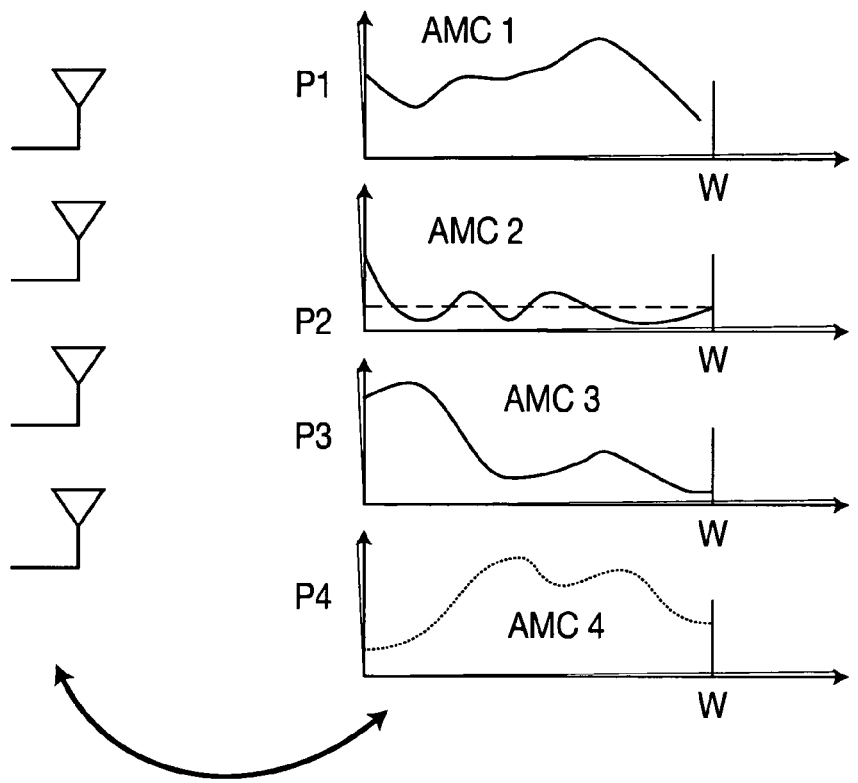
FIG. 8 is a diagram showing prior art method for adaptive modulation and coding in MIMO system.
Figure 9:
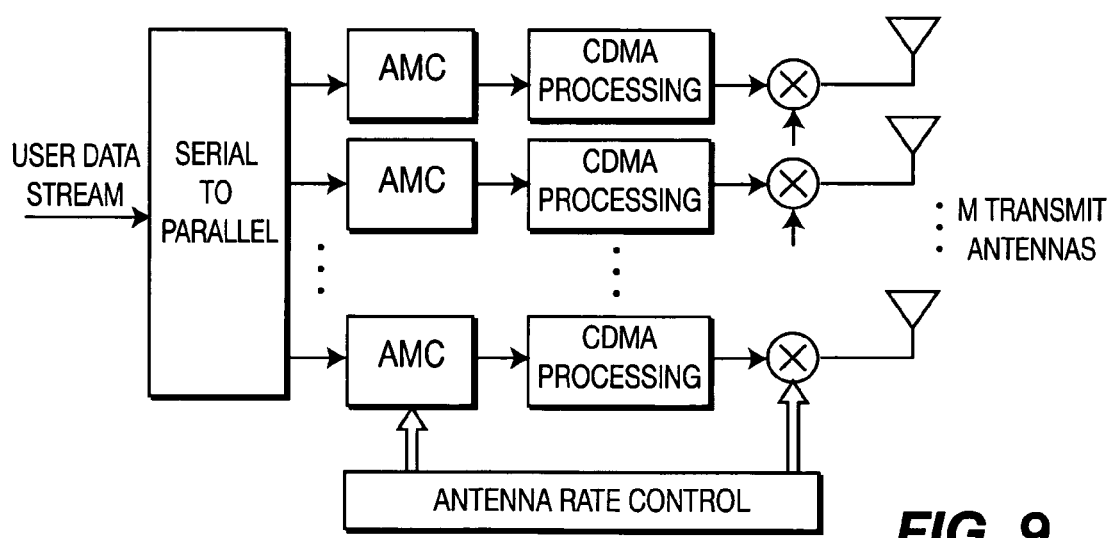
FIG. 9 is a block diagram of a transmitter implementing prior art PARC scheme.
Figure 10:
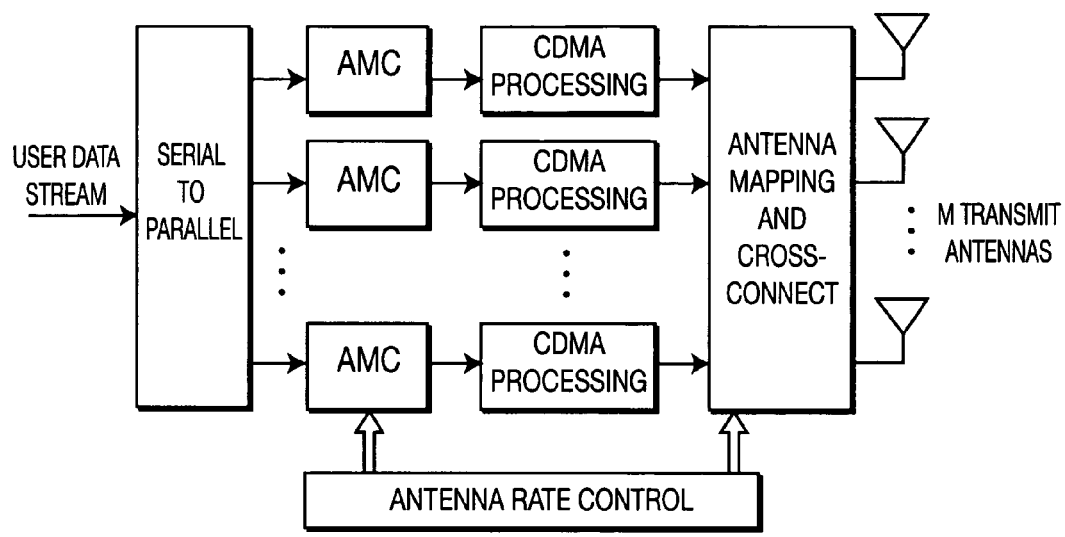
FIG. 10 is a block diagram of a transmitter implementing prior art S-PARC scheme.

The present invention will be described with reference to the drawing figures wherein like numerals represent like elements throughout.

Described below are the preferred embodiments of the present invention relating to the use of sub-carrier level resource allocation along with selection of antennas, modulation order, coding scheme, transmit power level, or the like in order to make full use of the capabilities of OFDM and MIMO.

The present invention can be implemented both in a wireless transmit/receive unit (WTRU) and a base station. The terminology "WTRU" includes, but is not limited to, a user equipment, a mobile station, a fixed or mobile subscriber unit, a pager, or any other type of device capable of operating in a wireless environment. The terminology "base station" includes, but is not limited to, a Node-B, a site controller, an access point or any other type of interfacing device in a wireless environment.

Figure 11:
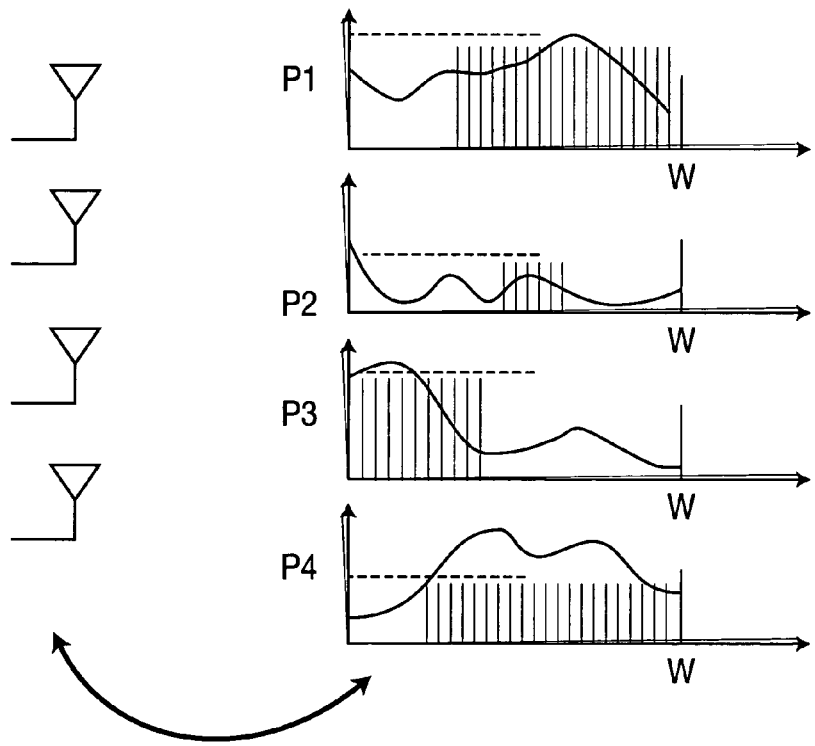
FIG. 11 is a diagram showing allocation of sub-carriers in accordance with a first embodiment of the present invention.

FIG. 11 is a diagram showing sub-carrier level resource allocation in accordance with a first embodiment of the present invention. Channel metric is calculated for each transmit antenna and sub-carriers are selected and allocated to each transmit antenna in accordance with the channel metric. All, a subset or none of sub-carriers are allocated to each transmit antenna. The set of sub-carriers allocated to each transmit antenna may be distinct from one another if such flexibility is desired or may be the same for simplicity. This gives flexibility to compromise between better link margin versus better throughput and permits more flexibility in resource allocation.

Since not all MIMO channels behave the same, but some channels are impaired or fade more than the others, and channel response is a time varying behavior and is frequency selective, it is not optimum to transmit all sub-carriers through all antennas. Better overall link quality can be achieved when a set of sub-carriers are transmitted on channels having sufficient quality for a constant average transmit power.

Figure 12:
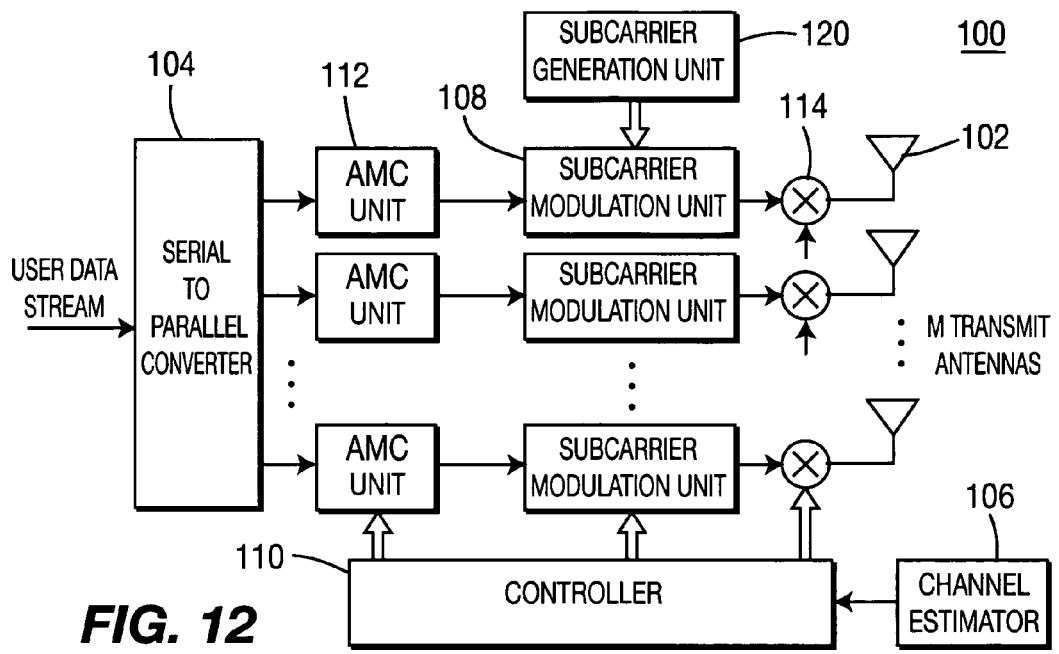
FIG. 12 is a block diagram of a transmitter in accordance with the first embodiment of the present invention.

FIG. 12 is a block diagram of a transmitter 100 in accordance with the present invention. The transmitter 100 comprises a plurality of antennas 102, a serial-to-parallel converter 104, a channel estimator 106, a plurality of sub-carrier modulation units 108, a controller 110 and a sub-carrier generation unit 120. A serial input user data stream is converted by the serial-to-parallel converter 104 to a plurality of parallel data streams. Each parallel data stream is modulated by a respective sub-carrier modulation unit 108 and forwarded to each transmit antenna 102 for transmission.

The channel estimator 106 calculates channel metric from measurements or quality indicators for each of transmit antennas 102. The channel metric may be estimated by the transmitter 100 in an open loop manner or may be reported from other communicating entity in a closed loop manner. In an open loop case, the channel estimator 106 performs channel estimation from the received signals, and in a closed loop case, a communication entity that receives communication signals from the transmitter 100 performs channel estimation and reports it back to the transmitter 100.

Each data stream is modulated by the sub-carrier modulation unit 108 in accordance with output signals from the controller 110. The controller 110 selects all, subset or none of sub-carriers for each transmit antenna 102 in accordance with the channel metric of each antenna 102. For example, if a channel gain is used as a channel metric, the controller 110 selects sub-carriers that exceed a predetermined threshold. A different, same or overlapping set of sub-carriers may be allocated to each antenna.

Optionally, the transmitter 100 may further perform adaptive modulation and coding (AMC) and power control per transmit antenna. The transmitter 100 includes an AMC unit 112 and/or a gain 114 for each transmit antenna and adjusts modulation order/coding rate and/or transmit power of each transmit antenna (per antenna power control) in accordance with the channel metric of each transmit antenna 102.

Figure 13:
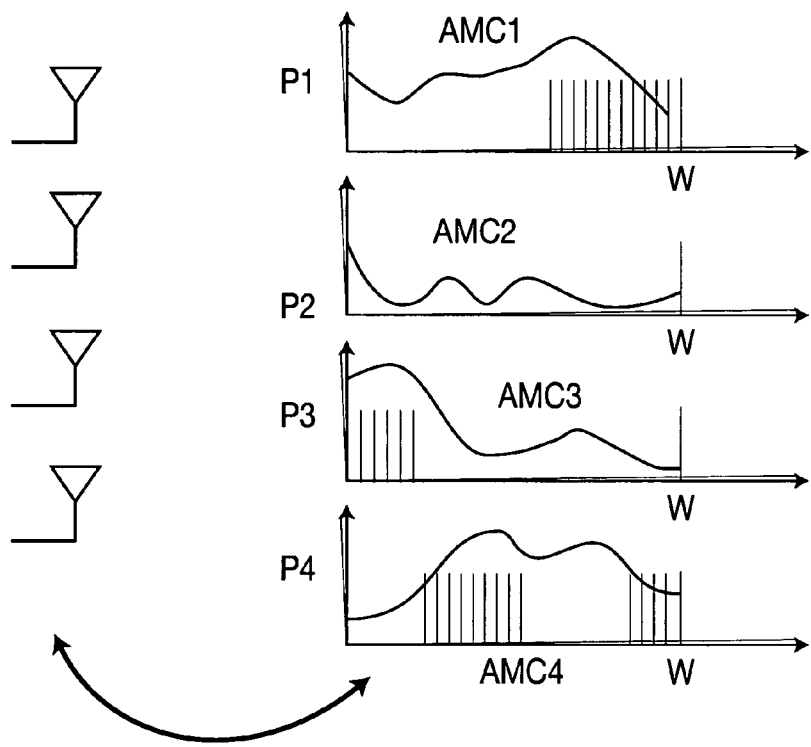
FIG. 13 is a diagram showing AMC.

FIG. 13 shows a scheme of AMC for each transmit antenna. As shown in FIG. 13, a different modulation order or coding rate may be applied to each transmit antenna 102 in accordance with channel metric of each transmit antenna 102. The AMC unit 112 adjusts modulation order and/or coding rate applied to data stream for each transmit antenna 102 in accordance with control signal from the controller 110.

The transmit power level for each transmit antenna is adjusted at the gain device 114 in accordance with control signal from the controller 110. The transmit power control may be either open loop or closed loop.

Figure 14:
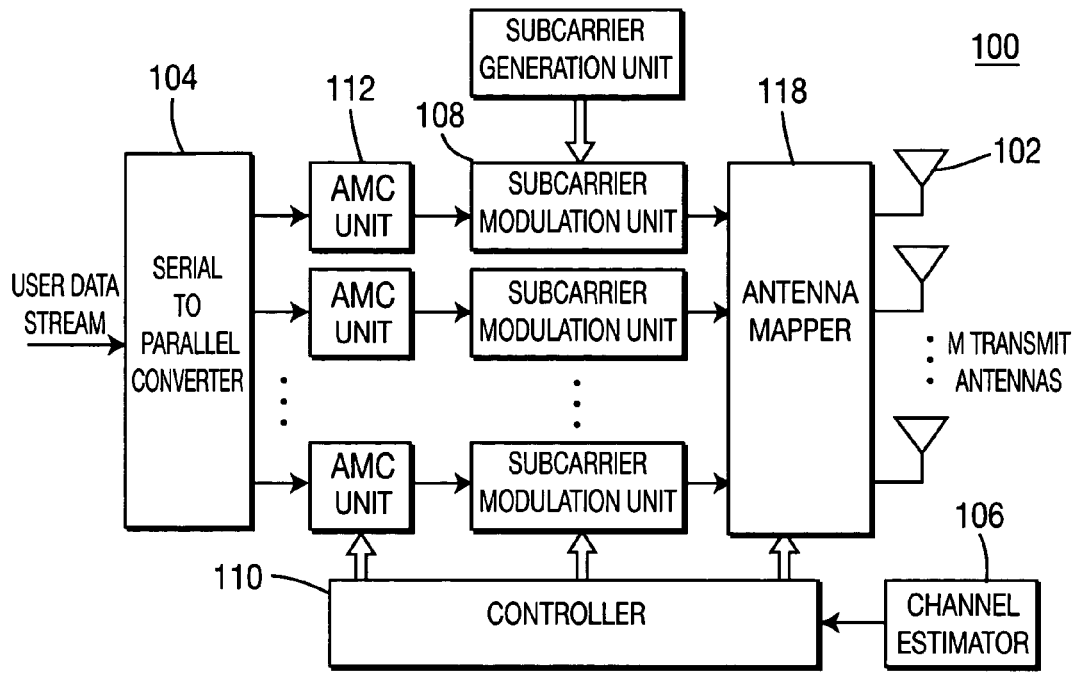
FIG. 14 is a block diagram of a waterfilling variation of the present invention.

FIG. 14 is a block diagram of another embodiment of the present invention. The transmitter 100 further includes a mapper 118 for mapping each data stream to a transmit antenna 102 in addition to the elements of the first embodiment. The mapper 118 selects a transmit antenna 102 and cross-connects each data stream to a transmit antenna 102 in accordance with the control signal from the controller 110.

In this embodiment, the MIMO scheme selects one or more antennas for transmission based on a metric that is calculated using measurements and quality indicators reported or estimated, and in addition the scheme selects all available subcarriers or a subset of them for transmission. In other words, the scheme selects the combination of best antenna, or a set of antennas, and subcarriers. Note that subsets or subcarriers may be distinct for each antenna if such flexibility is desired or constrained to be the same for simplicity sake. This gives the operator of the system flexibility to compromise between better link margin versus better throughput and permits more flexibility in resource allocation during scheduling. Both open loop or closed loop schemes may be used.

Not all MIMO channels behave the same, some are impaired or fade more than the others or exhibit unfavorable correlation to other channels. This behavior is a time varying and frequency selective behavior. Therefore, it is not optimum to transmit all subcarriers in all channels. Better link quality can be achieved when a set of subcarriers are transmitted on better quality channels for a constant average transit power within any applicable power spectral density requirements.

This embodiment recognizes that the quality of each MIMO channel and each OFDM subcarrier (channel) will in general be different and time varying, and that a diversity/capacity advantage can be gained by intelligent usage of those channels. The channel qualities may be signaled to, or estimated by, the transmitter. Complexity and regulations in some implementations may limit the antenna/frequency flexibility.

Figure 15:
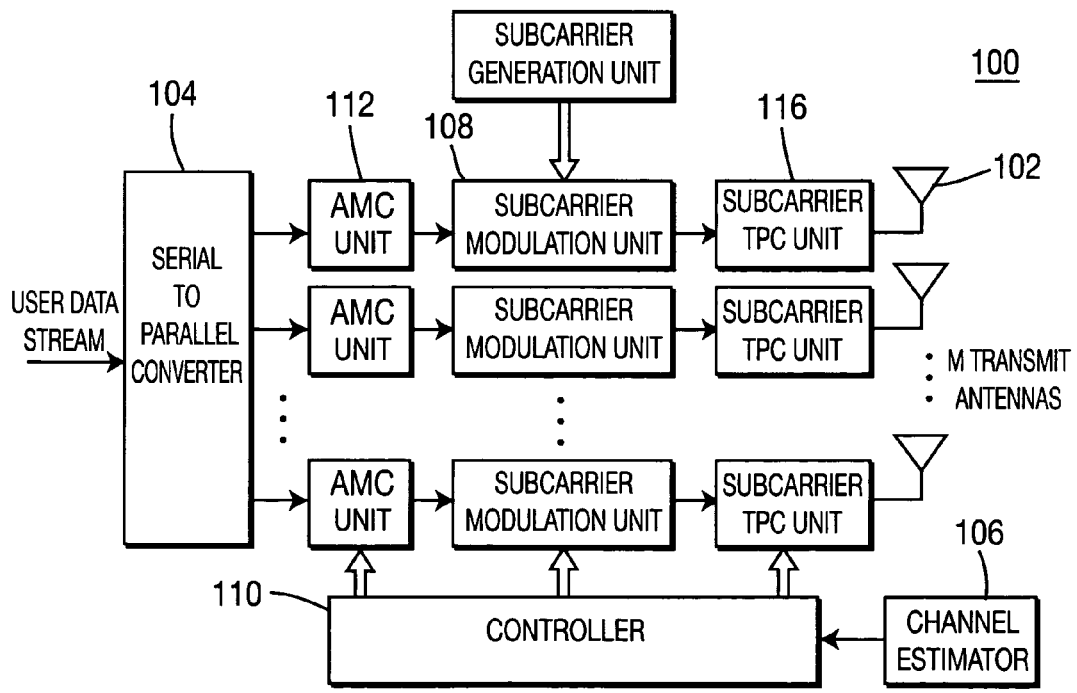
FIG. 15 is a block diagram of a transmitter in accordance with a second embodiment of the present invention.

FIG. 15 is a block diagram of a transmitter 100 in accordance with a second embodiment of the present invention. The transmitter 100 may comprise a plurality of transmit antenna circuits, each transmit antenna circuit including an AMC unit 112, a subcarrier modulation unit 108, a sub-carrier transmit power control (TPC) unit 116 and a transmit antenna 102. The transmitter 100 may further comprise to the serial-to-parallel converter 104, the channel estimator 106 and the controller 110 used in the first embodiment. The channel estimator 106 may calculate a channel metric for each of the transmit antenna circuits. The controller 110 is in communication with the channel estimator 106 and the transmit antenna circuits, and may be used to select a subset of the transmit antenna circuits. The controller 110 may be further used to determine whether to allocate all, a subset or none of a plurality of OFDM sub-carriers for each of the selected transmit antenna circuits based on the channel metrics calculated by the channel estimator 106. The selected transmit antenna circuits may be used to adjust transmit power for each of the allocated OFDM sub-carriers, and to transmit signals using the OFDM sub-carriers.

The sub-carrier TPC unit 116 in each of the transmit antenna circuits adjusts transmit power level for each sub-carrier in accordance with a control signal received from the controller 110. Sub-carrier level transmit power control is, preferably, a waterpouring technique, although other techniques may be used. The transmit power level of each sub-carrier is adjusted according to the channel response for each sub-carrier. Therefore, the transmit power level across the transmission band is different for each sub-carrier or groups of sub-carriers.

The waterpouring algorithm preferably operates across all antennas and all subcarriers and adjusts the transmit power level for each subcarrier. However, this is sometimes not desirable. When a full set of N transmit antennas and M receive antennas are used, the complexity of the receiver is typically proportional to $M^4N^4$. In other words, the complexity of the receiver is affected by the number of antennas at the transmitter and the receiver. Moreover, it is often the case that not all antenna signals go through desirable channel conditions.

Another embodiment of the present invention is an enhancement to the aforementioned waterpouring technique. In accordance with this embodiment, a subset of transmit antenna is selected for transmission and waterpouring is applied only to the selected transmit antenna(s). FIG. 16 shows selection of a transmit antenna in accordance with channel response of each transmit antenna. In FIG. 16, antennas $102_a$, $102_c$, $102_d$ are selected for transmission and antenna $102_b$ is excluded from transmission. After a subset of antennas, such as antennas $102_a$, $102_c$, $102_d$, is selected, a waterpouring technique, or alternative technique may be applied to the selected transmit antennas.

The number of transmit antennas 102 is maintained at a reasonable number, (may be predetermined), and keeps the receiver complexity down. At the same time, by selecting the best antenna combination overall performance is maintained.

In accordance with another embodiment of the present invention, waterpouring is implemented based on SNR, instead of channel response. This technique considers the impact of the noise level present at each sub-carrier. Typically, the background noise is treated as being white. In other words, the background noise is assumed to be the same level for all sub-carriers. This assumption is typically not correct for unlicensed bands. In unlicensed bands, other transmissions can overlap with part of the sub-carriers in the transmission band and the received signal may be subject to substantially different levels of interference regardless of the channel response. Therefore, SNR can provide a better metric for each sub-carrier or group of sub-carriers, although other interference/noise/signal measurements may be used, such as signal to interference ratio (SIR) or signal to interference noise ratio (SINR). The background noise level can be substantially different for different part of spectrum, and hence the preferred solution may be different than the one that assumes a flat noise spectrum.

FIG. 17 illustrates a scheme of SNR-based waterpouring. FIG. 17 shows both channel response and SNR for the OFDM spectrum. Sub-carriers are selected and transmit power is allocated in accordance with the SNR. Compared to FIG. 16, which waterpouring is based on channel response, in FIG. 17, some of the subcarriers are newly added and some are removed. This embodiment better accommodates and preserves high performance in cases where the background noise level across the spectrum is changing in addition to the channel response.

Figure 18:
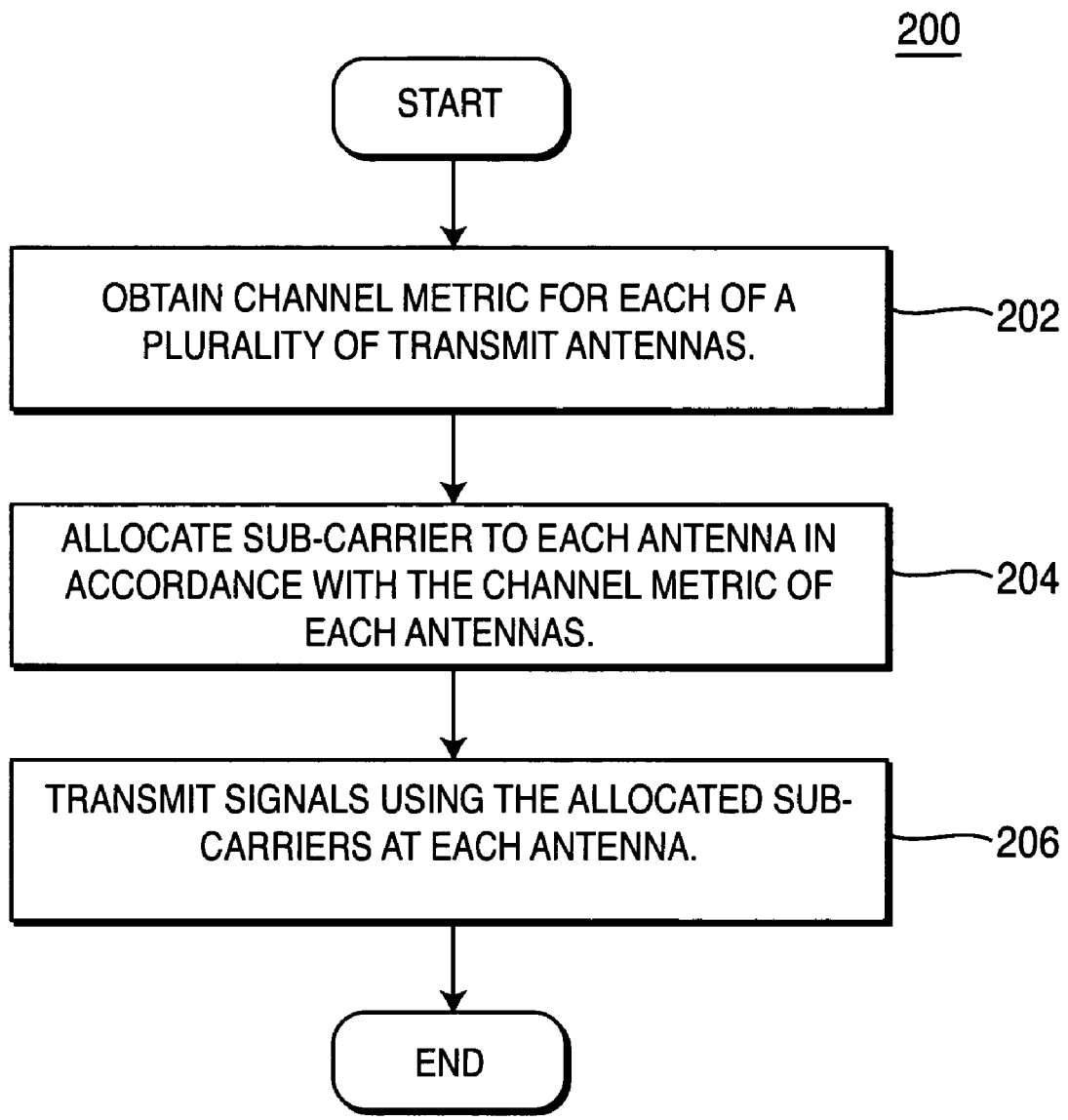
FIG. 18 is a flow diagram of a process for sub-carrier and antenna selection in an MIMO-OFDM communication system in accordance with the present invention.

FIG. 18 is a flow diagram of a process 200 for sub-carrier and antenna selection in an MIMO-OFDM communication system. Channel metric for each of a plurality of transmit antennas is obtained (step 202). Sub-carriers are allocated to each antenna in accordance with the channel metric of each antenna (step 204). Messages are transmitted using the allocated sub-carriers at each antenna (step 206). AMC may be performed per antenna basis, per sub-carrier or group of sub-carrier basis. Power control may be implemented per antenna basis or per sub-carrier basis. In performing power control per sub-carrier basis, a subset of transmit antennas may be selected and waterpouring may be applied only to the selected antennas. Waterpouring may be based on SNR instead of channel response.

The elements of FIGS. 12, 14 and 15 may be implemented using a single integrated circuit (IC), such as an application specific integrated circuit (ASIC), multiple ICs, discrete components or a combination of IC(s) and discrete components.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method, implemented by a transmitter, of allocating sub-carrier level resources, the method comprising:
    configuring the transmitter with a plurality of transmit antenna circuits, each transmit antenna circuit including a sub-carrier modulation unit, a sub-carrier transmit power control (TPC) unit and a transmit antenna connected in series;
    using a channel estimator residing in the transmitter to calculate a channel metric for each of the transmit antenna circuits;
    using a controller residing in the transmitter and in communication with the channel estimator and the transmit antenna circuits to select a subset of the transmit antenna circuits;
    using the controller to determine whether to allocate all, a subset or none of a plurality of orthogonal frequency division multiplexing (OFDM) sub-carriers for each of the selected transmit antenna circuits based on the channel metrics calculated by the channel estimator;
    using the selected transmit antenna circuits to adjust transmit power for each of the allocated OFDM sub-carriers; and
    using the selected transmit antenna circuits to transmit signals using the allocated OFDM sub-carriers.

2. The method of claim 1 further comprising mapping each of the selected subsets of OFDM sub-carriers to one of the transmit antennas.

3. The method of claim 1 further comprising performing adaptive modulation and coding (AMC) on a per-OFDM sub-carrier basis.

4. The method of claim 1 wherein the transmitter is located in a wireless transmit/receive unit (WTRU).

5. The method of claim 1 wherein each transmit antenna circuit further includes an adaptive modulation and coding (AMC) unit.

6. A transmitter comprising:
    a plurality of transmit antenna circuits, each transmit antenna circuit including a sub-carrier modulation unit, a sub-carrier transmit power control (TPC) unit and a transmit antenna connected in series;
    a channel estimator configured to calculate a channel metric for each of the transmit antenna circuits; and
    a controller in communication with the channel estimator and the transmit antenna circuits, the controller configured to select a subset of the transmit antenna circuits, the controller being further configured to determine whether to allocate all, a subset or none of a plurality of orthogonal frequency division multiplexing (OFDM) sub-carriers for each of the selected transmit antenna circuits based on the channel metrics calculated by the channel estimator;
    wherein the selected transmit antenna circuits are configured to adjust transmit power for each of the allocated OFDM sub-carriers, and to transmit signals using the allocated OFDM sub-carriers.

7. The transmitter of claim 6 further comprising a mapping unit configured to map each of the selected subsets of OFDM sub-carriers to one of the transmit antennas.

8. The transmitter of claim 6 wherein the controller is further configured to perform adaptive modulation and coding (AMC) on a per-OFDM sub-carrier basis.

9. The transmitter of claim 6 wherein the transmitter is located in a wireless transmit/receive unit (WTRU).

10. The transmitter of claim 6 wherein each transmit antenna circuit further includes an adaptive modulation and coding (AMC) unit.

* * * * *